(12) United States Patent
Cole et al.

(10) Patent No.: US 6,496,236 B1
(45) Date of Patent: Dec. 17, 2002

(54) MULTI-MODE BACKLIGHT FOR ELECTRONIC DEVICE

(75) Inventors: James R Cole, Albany, OR (US); James P Dickie, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/527,414

(22) Filed: Mar. 17, 2000

(51) Int. Cl.$^7$ .............................................. G02F 1/1335
(52) U.S. Cl. ........................... 349/61; 362/27; 345/102; 349/68
(58) Field of Search ..................... 349/68, 61; 345/102; 362/27, 227

(56) References Cited

U.S. PATENT DOCUMENTS

| | | | | |
|---|---|---|---|---|
| 5,426,429 A | * | 6/1995 | Norman et al. ............. 340/953 |
| 5,578,998 A | * | 11/1996 | Kasprowicz ................. 340/642 |
| 5,644,291 A | * | 7/1997 | Jozwik ........................ 340/472 |
| 5,796,382 A | * | 8/1998 | Beeteson ..................... 345/102 |
| 5,808,597 A | * | 9/1998 | Onitsuka et al. ............. 345/102 |
| 6,078,145 A | * | 6/2000 | Tillinghast et al. ......... 315/241 S |
| 6,151,008 A | * | 11/2000 | Zhang ......................... 345/102 |
| 6,155,694 A | * | 12/2000 | Lyons et al. ................. 362/228 |
| 6,243,067 B1 | * | 6/2001 | Noguchi et al. ............. 345/102 |
| 6,268,844 B1 | * | 7/2001 | Jun ............................. 345/102 |

* cited by examiner

Primary Examiner—Kenneth Parker
(74) Attorney, Agent, or Firm—Timothy F. Myers

(57) ABSTRACT

An electronic device has a display housing which includes a display panel and at least two light sources used to backlight the display panel. The at least two light sources are activated independently of each other to selectively increase or decrease the illumination of the display panel. A circuit is coupled to the at least two light sources. The circuit determines which of the at least two light sources is chosen such that the combined life of the at least two light sources is increased.

22 Claims, 6 Drawing Sheets

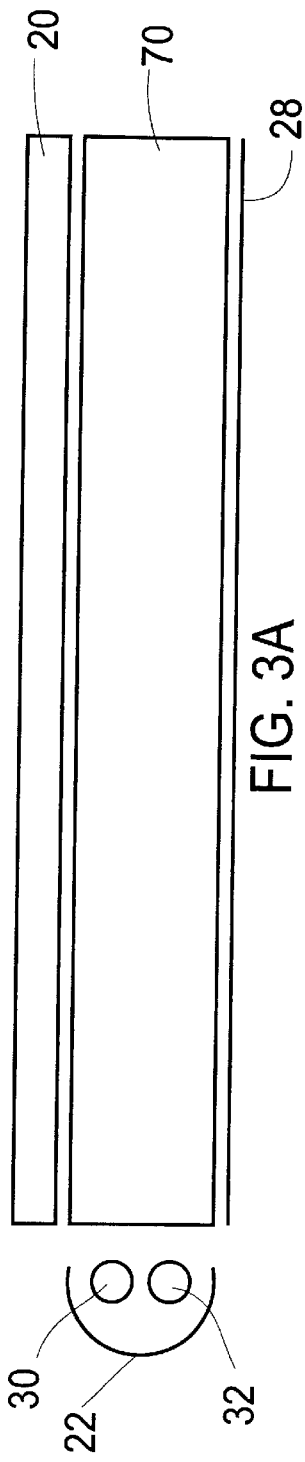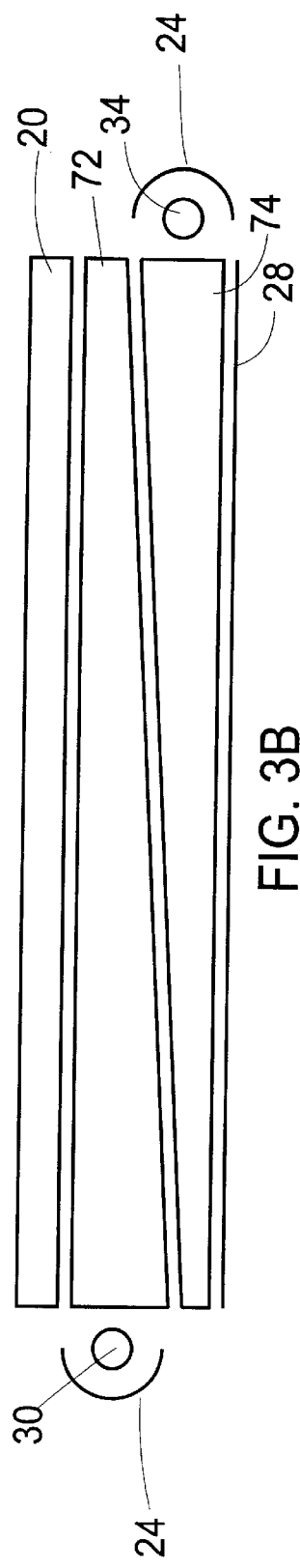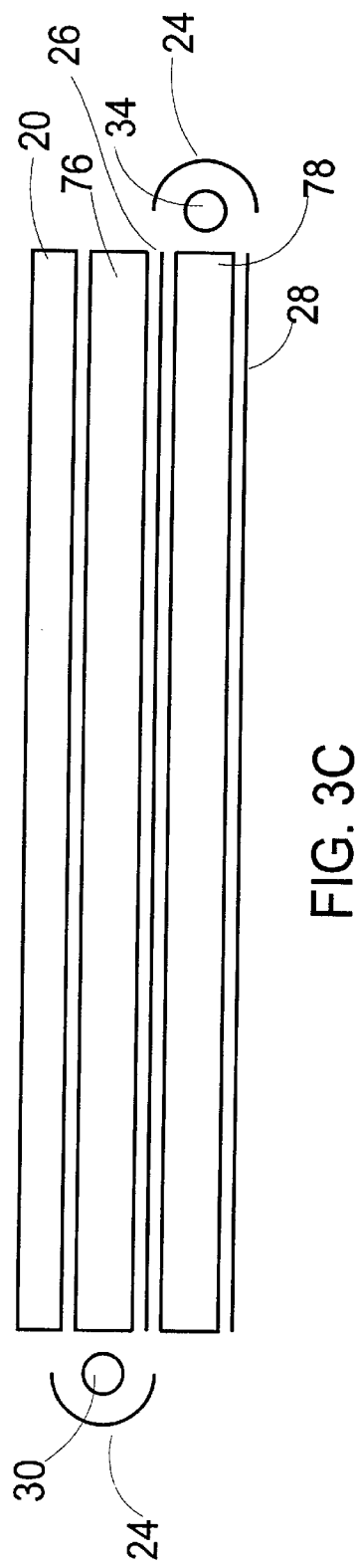

MULTI-MODE BACKLIGHT FOR ELECTRONIC DEVICE

FIELD OF THE INVENTION

This invention relates to display panels for electronic devices, more specifically it relates to using multiple backlight light sources to control brightness and extend the operating life of the display panels.

BACKGROUND OF THE INVENTION

Electronic devices, such as portable computers, typically have display panels with light sources that consist of a single cold-cathode fluorescent lamp (CCFL). The light from the CCFL is consolidated and channeled along a "light pipe" behind the display panel, typically a liquid crystal display (LCD). Various mechanism in the light pipe cause the light to exit the light pipe uniformly across its surface and enter the back of the LCD, thus the CCFL are commonly known as backlight light sources. The maximum brightness of the display panel is determined in a large extent to the amount of current flowing in the CCFL light source. The brightness of the display panel can be increased or decreased by respectively increasing or decreasing the current flowing in the CCFL light source. However, there are limits on both the maximum current and minimum current that is allowed to flow into the CCFL light source. These current restrictions limit the effective range of brightness control that is achievable with a single CCFL. Consumers are demanding a larger adjustment range to allow for multiple operating environments ranging from complete darkness to full sunlight. One approach used is to provide multiple light sources to increase the brightness. However, in some electronic devices such as portable computers, additional light sources will cause the battery life to be reduced. Since the maximum brightness does not always need to be used, only one light source needs to be used to illuminate the display without producing severely non-uniform lighting. For maximum brightness operation, such as when on AC power on in full sunlight, multiple light sources can be on. One problem with exclusively selecting one light source is that the combined operating life of multiple light sources is reduced. Therefore a need exists to extend the operating life of the light sources when using multiple CCFL backlight light sources that are selectively enabled.

SUMMARY

An electronic device has a display housing which includes a display panel and at least two light sources used to backlight the display panel. The at least two light sources are activated independently of each other to selectively increase or decrease the illumination of the display panel. A circuit is coupled to the at least two light sources. The circuit determines which of the at least two light sources is chosen such that the combined life of the at least two light sources is increased.

BRIEF DESCRIPTION OF THE DRAWINGS

FIG. 3A is an exemplary construction of incorporating multiple backlights into a display panel.

FIG. 3B is a first alternative exemplary construction of incorporating multiple backlights into a display panel using wedge shaped light pipes.

FIG. 3C is a second alternative exemplary construction of incorporating multiple backlights into a display panel using stacked flat light pipes.

DETAILED DESCRIPTION OF THE PREFERRED EMBODIMENTS

Figure 1:
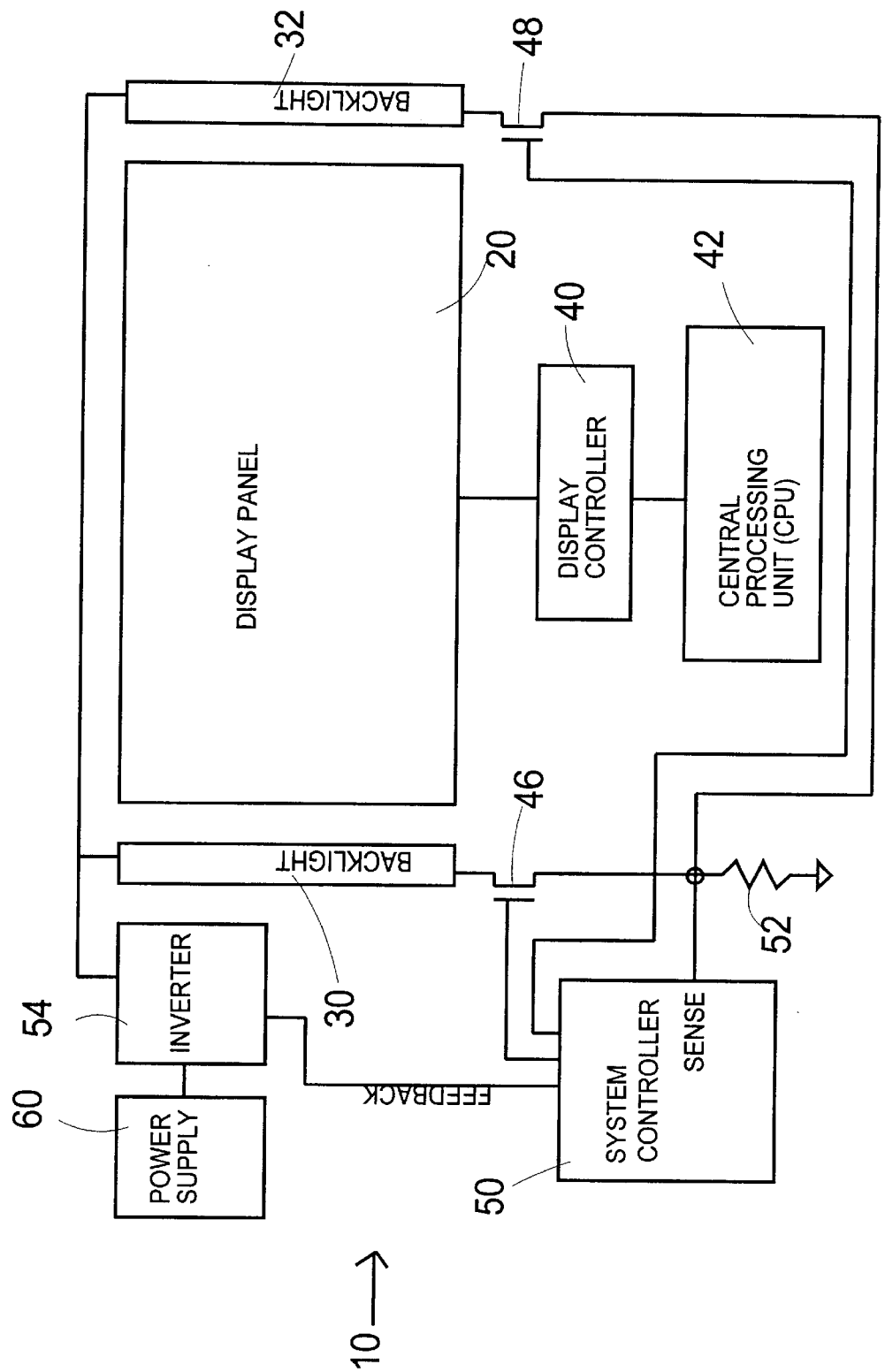
FIG. 1 is a block diagram of an exemplary electronic device incorporating one embodiment of the invention.

FIG. 1 is a block diagram of an exemplary electronic device 10, such as a portable computer or personal data assistant (PDA) to name a couple. The electronic device 10 has a display panel 20 that is illuminated with multiple backlights 30/32. Example backlights are CCFL light sources but other light sources such as light emitting diodes (LEDs), incandescent, and halogen, to name a few, can be used and still meet the spirit and scope of the invention. The backlights 30/32 are supplied energy from power supply 60 using a voltage step-up device, such as inverter 54. The image on the display panel is manipulated using display controller 40 under the control of central processing unit (CPU) 42.

One purpose of having multiple (at least two) backlights in the display is to allow for different levels of brightness from the display panel 20. For instance, in bright sunlight, it is desirable to have all backlights 30/32 on to counter the intense light from the sun striking the display panel 20 surface. When traveling on a plane late at night, it is desirable to keep the light from the backlights 30/32 from being too bright and thus at a low intensity level. In this situation, only one backlight needs to be activated and operated at a low intensity level. At other times, such as in an office environment with typical light levels, it is desirable to have a display intensity somewhere in-between the full on and low intensity level by selecting whether to operate with one or more of the backlight light source and by adjusting the voltage output from the inverter 54, preferably with an intensity control operated by the user of the electronic device 10.

In typical use only one backlight 30/32 will need to be activated. Each backlight 30/32 is controlled by a switch 46/48 that is controlled by signals from an electronic circuit, an exemplary electronic circuit being a system controller 50. System controller 50 is envisioned as being embodied as a microcontroller, such as a keyboard controller found in conventional personal and portable computers. However, system controller 50 is optionally implementable with discrete circuitry or programmable logic.

Also shown in FIG. 1 is an optional current sensing circuit, exemplified as a resistor 52 which is coupled to system controller 50 and the current return from backlights 30/32. The sensing circuit detects the amount of current flowing through the selectively activated backlights 30/32. The system controller 50 has a sense input that is used to read the voltage drop across resistor 52, the voltage drop being an indication of current flowing through the selectively activated backlights 30/32.

Figure 2:
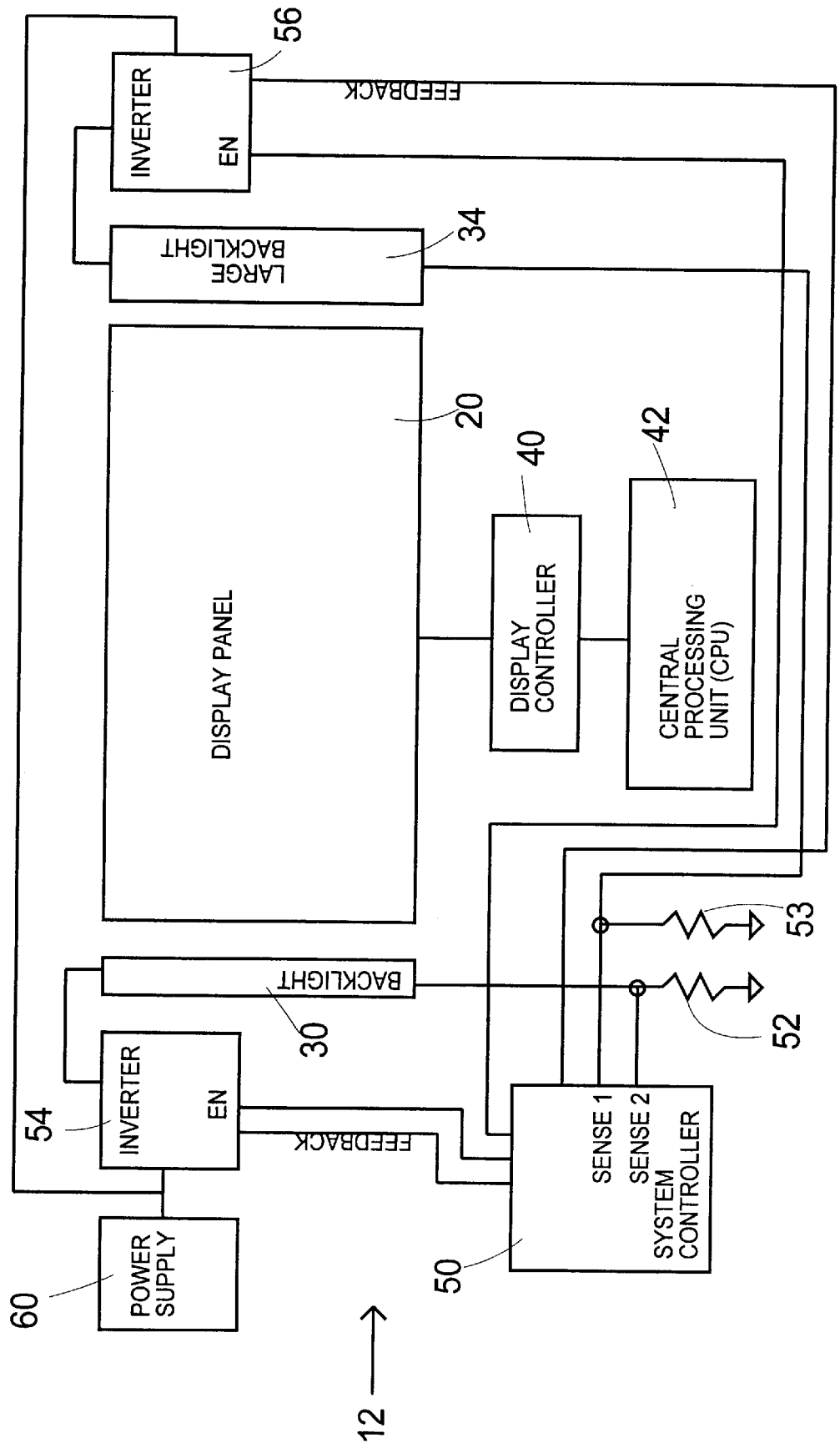
FIG. 2 is a block diagram of a second exemplary electronic device incorporating an alternative embodiment of the invention.

FIG. 2 is an alternative embodiment for an electronic device 12 having an alternative circuit for controlling the activation of backlights 30/34. In this exemplary embodiment, the backlights 30/34 are each driven by a respective inverter 54/56, which are designed to match the properties of the respective backlight 30/34.

Inverters 54/56 each have an enable input. An enable input, when activated, allows the selected inverter 54/56 to step up a lower voltage from power supply 60 to a higher voltage sufficient to operate a respective backlight 30/34.

Also shown is an optional embodiment of current sensing in which resistors 52/53 are separately coupled to backlights 30/34 and system controller 50. The system controller 50 in this exemplary embodiment has multiple sense inputs, SENSE 1 and SENSE 2, that measure the voltage drop across resistors 52/53.

FIGS. 3A–3C illustrate different embodiments for physically implementing multiple backlights into display panels.

FIG. 3A is an embodiment which positions two backlights 30/32 side by side at an edge of a single flat light pipe 70 disposed behind display panel 20. Flat light pipe 70 is used to evenly disburse light across the backside of display 20 for illumination. Light generated from backlights 30/32 enter the edge of the flat light pipe 70 directly, and indirectly after being reflected from large reflector 22. Large reflector 22 is designed to surround the multiple backlights 30/32 so that substantially all of the light generated by the backlights 30/32 enters the flat light pipe 70. An optional flat reflector 28 is applied to the rear of the flat light pipe 70 to reflect light that exits the backside of the flat light pipe 70. Optionally, flat light pipe 70 can be implemented using a standard wedge light pipe design. If wedge light pipes are used, additional embodiments for multiple backlights can be implemented.

FIG. 3B is a first alternative embodiment for physically implementing multiple backlights. A first backlight 30 and a second backlight 34 are disposed on separate edges of display panel 20. First backlight 30 emits light directly, and indirectly using a reflector 24, into a first wedged light pipe 72. Second backlight 34 emits light directly, and indirectly using another reflector 24, into second wedge light pipe 74. Light from first wedge light pipe 72 is directed onto display 20 to illuminate it. Light from second wedge light pipe 74 must first pass through first wedge light pipe 72 before reaching display panel 20. By separating the two backlight 30/34, localized heat build-up (due to inefficiency of the backlights) is reduced. Another advantage of using wedge shaped light pipes is that a compact design is achieved. Optionally, the two backlights 30/34 can be two different sizes, or types. That is, one backlight can have a higher intensity output than other backlights to further optimize display panel viewing under different ambient light conditions.

FIG. 3C is a second alternative embodiment for physically implementing multiple backlights. In this exemplary embodiment, a first backlight 30 emits light directly, and indirectly with reflector 24, into a first flat light pipe 76. This first flat light pipe 76 is stacked with a second flat light pipe 78. Optionally, mesially interposed between the first flat light pipe 76 and the second flat light pipe 78 is a translucent reflector 26. Translucent reflector 26 enables more efficient transmission of light from a first backlight 30. The efficiency is achieved because light that escapes from the first light pipe 76 is substantially reflected back from the translucent reflector 26 without having to enter second flat light pipe 78, exit and reflect off of flat reflector 28, reenter second flat light pipe 78 and exit into first light pipe 76 before reaching display panel 20. Translucent reflector 26 is comprised of preferably a surface coated film such that light is substantially transmissive in one direction and substantially reflected from the opposing direction, i.e. similar to a one-way mirror.

Rather than always selecting one of the backlight light sources to illuminate the display when operating a minimum intensity levels, it is preferable to alternatively select from the multiple backlight light sources. By properly selecting algorithmically between the multiple backlight light sources, the operating life of the backlight light sources can be increased.

Figure 4:
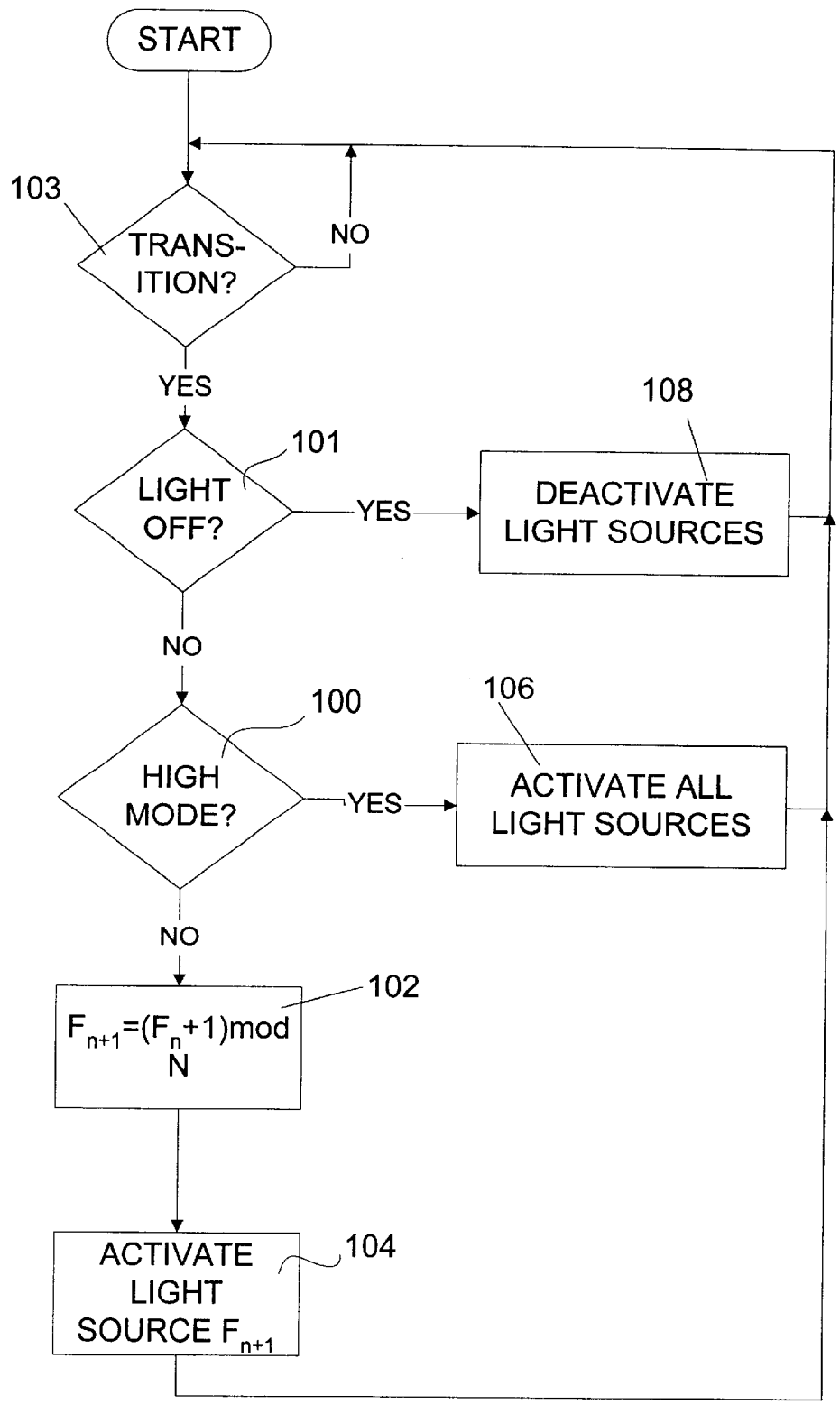
FIG. 4 is an exemplary flow chart for selecting which backlight to activate to illuminate the display based on a round robin scheme.

FIG. 4 is an exemplary flowchart of one method by which to control the activation of the backlight light sources. In block 103, the method waits for a display panel illumination transition to occur. If a transition occurs, in block 101 a check is made to determine if the backlights should be turned off. If so, then in block 108, the backlight light sources are deactivated. If it is determined that at least one backlight is to be illuminated, in block 100 a check is made to determine if all backlights are to be activated or not. If so, then in block 106 all backlight light sources are activated. Otherwise, in block 102, a "round robin" scheme is used to select the next backlight to illuminate the display. Letting "N" equal the total number of light sources, "$F_n$" the previously chosen light source, and "$F_{n+1}$" the next light source to be activated, "$F_n$", is incremented and operated on by modulo N. That is $F_{n+1}=(F_n+1)$modulo N. This "round robin" method cycles through each backlight light source to allow each operate only a portion of the total time that the display panel is operated, thereby increasing the life of the display panel as opposed to just preferentially using only one backlight light source. Another feature of this approach is that when CCFL backlight light sources are used and aged, the amount of light produced for a given voltage and current is diminished. By constantly cycling through the available backlights, there will not be as much variation in intensity levels as there is if one backlight were to operate until it failed and then the other backlight substituted for it.

Because most users do not operate their electronic devices with periodic consistency, the round robin scheme may not be the most optimum method of selecting the light source to increase the life of the backlight light sources.

Figure 5:
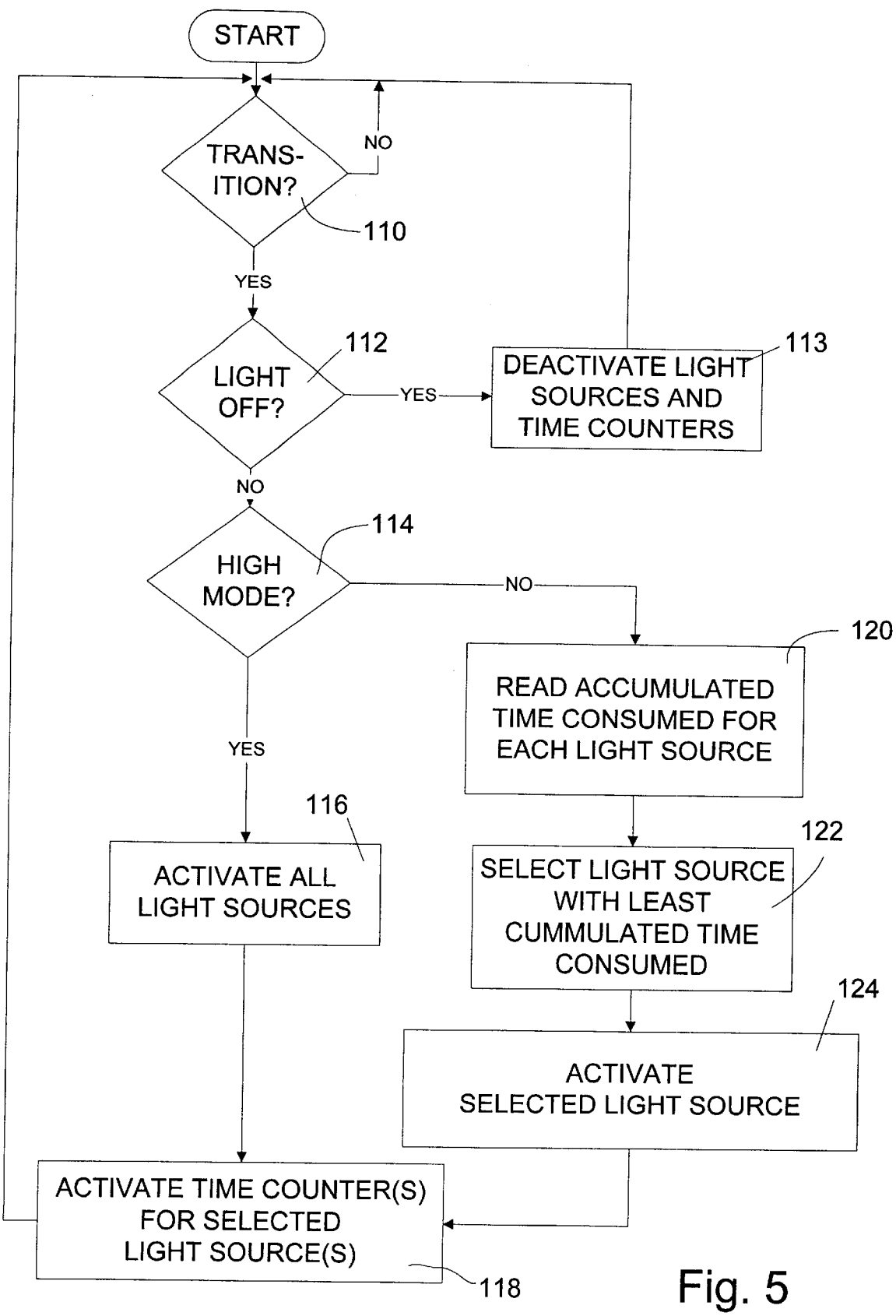
FIG. 5 is an exemplary flow chart for selecting which backlight to activate based on the previous cumulated timed consumed.

FIG. 5 is an exemplary flowchart of an alternative method to selecting the backlight source based on the actual amount of time that the backlights have been previously utilized. A time consumed register is allotted to each backlight source. It is assumed that the time consumed registers have been initialized to reflect that each backlight has not been operated prior to starting the method. In block 110, the method waits for a transition in the illumination of the display panel. Such a transition might be initiated by the user pressing the on/off switch, a lid closure, a timeout of the electronic device, or a programmed event. In block 112, a check is made to see if any backlight is to be enabled or if they are to be disabled (turned off). If turned off in block 103 the backlight light sources are deactivated and respective time counters disabled. If a backlight is to be enabled, in block 114 a check is made to determine if all backlights are to be activated, a "high mode". If so, in block 116, all light sources are activated. Then in block 118, the time counters for all backlights are activated to begin logging the "on" time of the selected backlight. If the "high mode" was not selected in block 114, that is only one light source is to be activated, the method reads the accumulated time consumed registers for each light source in block 120. Then in block 122, the method selects the backlight light source with the least cumulated time consumed. In block 124, the selected backlight light source is then activated. Flow continues in block 118 where the time counter for the selected backlight light source is activated to log the amount of time consumed by the selected backlight.

It may be preferred in some embodiments that different types or sizes of backlight sources be used to provide the multiple backlights for the display panel.

A more complex method to select the backlight light source to be activated utilizes the amount of current cumulatively consumed by a backlight source. Current (I) is used because each backlight light source is given a rated life ($T_{max}$ hours) for a rated max current ($I_{max}$). Running the backlight light source at less than the max current will extend the life of the backlight light source. Unfortunately, the relationship between operating current and operating life may not necessarily be a linear relationship. However, the number of hours the backlight is operated can be derated by some function that is dependent on I, the current in the backlight light source. This function is defined as F(I). In other words, operating a backlight for T hours as some current level I (but less than $I_{max}$) results in less than $T/T_{max}$ portion of the backlight light source life being consumed. The portion of rated life consumed is defined as "P" where $P=F(I)*T/T_{max}$. To choose the optimum backlight light source to increase the backlight life, the method keeps track of the amount P (a function of current and time) for each backlight, and always selects and activates the backlight with the lowest P value.

Figure 6:
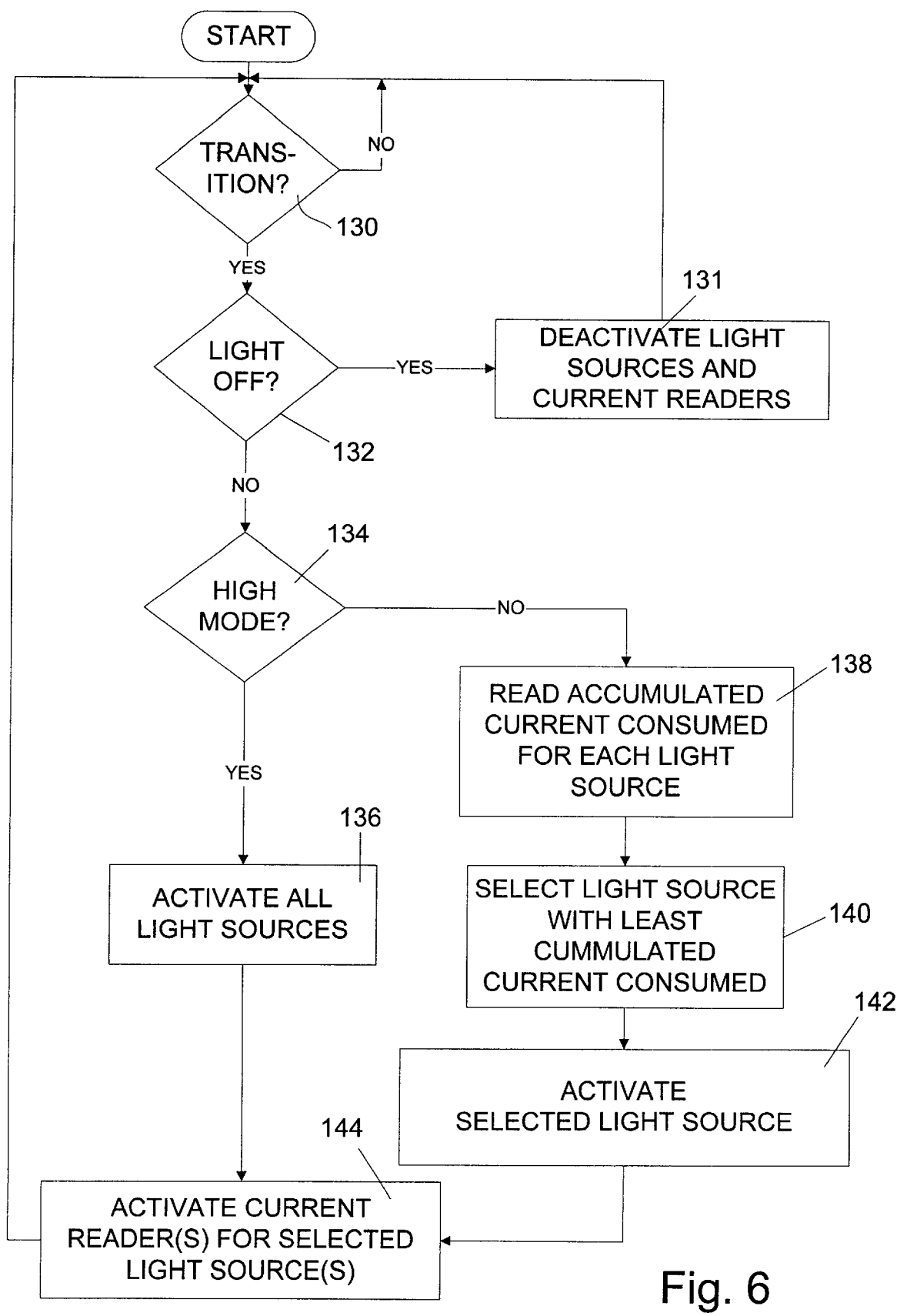
FIG. 6 is an exemplary flow chart for selecting which backlight to activate based on the amount of cumulated current consumed.

Thus in FIG. 6, an exemplary flowchart illustrates the steps used to select and activate the backlight having the longest available life using the cumulated current method. In block 130, the method waits for a display panel transition to occur. If a transition occurs, then in block 132 a check is made to see if the transition is to turn off the backlights. If yes, then in block 131 the backlight light sources and current readers are deactivated and control returns to block 130 to await the next transition. If the display is to be illuminated then in block 134 a check is performed to see if the "high mode" is selected. If it is, then in block 136 all light sources are activated and in block 144 all sources' current readers are activated to begin monitoring the amount of current used. If in block 134 the "high mode" was not selected, then in block 138 the accumulated current consumed registers for each light source is read. In block 140, the light source with the least accumulated current consumed is selected. In block 142 the selected light source is activated. Then in block 144 the current reader for the selected light source is activated. Optionally in block 144, the current reader applies the function $P=F(I)*T/T_{max}$ to optimize the accumulated current to account for different size, types, or properties of backlight light sources.

Although several different embodiments and options have been shown, illustrated and described, those skilled in the art will appreciate that several different modifications could be made and still meet the spirit and scope of the invention. Accordingly, the invention is only limited by the following claims.

What is claimed is:

1. An electronic device, comprising:
    a display housing including,
        an electronic display panel, and
        at least two light sources for backlighting the display panel, at least one of the light sources being activated independently of the other light source to selectively increase and decrease the illumination to the display panel; and
    a circuit coupled to said at least two light sources, said circuit determining which of the at least two light sources is chosen wherein the combined life of the at least two light sources is increased.

2. The electronic device of claim 1 wherein at least one of the at least two light sources is a different sized light source from the remaining light sources.

3. The electronic device of claim 1 wherein the circuit selects the least cumulatively used light source to be activated.

4. The electronic device of claim 1 wherein said circuit includes current measuring circuitry to detect the cumulatively consumed current of each of the at least two light sources and wherein said circuitry selects the light source to be activated based on the least cumulatively consumed current for each light source.

5. The electronic device of claim 1 wherein said display housing further includes at least two light pipes for diffusing the respective light produced by each of the at least two light sources.

6. The electronic device of claim 5 wherein the at least two light pipes are stacked.

7. The electronic device of claim 6 wherein the at least two light pipes are wedged shaped.

8. The electronic device of claim 1 wherein said display housing further includes a single inverter and a set of switches coupling said at least two light sources to said single inverter.

9. The electronic device of claim 1 wherein said display housing further includes a set of inverters, each inverter of the set respectively coupled to each of said at least two light sources.

10. A display for an electronic device, comprising:
    an electronic display panel;
    at least two light sources for backlighting the display panel, at least one of the light sources being activated independently of the other light source to selectively increase and decrease the illumination to the display panel; and
    a circuit coupled to said at least two light sources, said circuit determining which of the at least two light sources is chosen wherein the combined life of the at least two light sources is increased.

11. The display of claim 10 wherein at least one of the at least two light sources is a different sized light source from the remaining light sources.

12. The display of claim 10 wherein the circuit selects the least cumulatively used light source to be activated.

13. The display of claim 10 wherein the circuit includes current measuring circuitry to detect the cumulatively consumed current of each of the at least two light sources and wherein said circuitry selects the light source to be activated based on the least cumulatively consumed current by each light source.

14. The display of claim 10 further comprising at least two light pipes for diffusing the light produced by each of the at least two light sources.

15. The display of claim 14 wherein the at least two light pipes are stacked.

16. The display of claim 14 wherein the at least two light pipes are wedged shaped.

17. The display of claim 10 wherein said display further comprises a single inverter and a set of switches coupling said at least two light sources to said single inverter.

18. The display of claim 10 further comprising a set of inverters, each inverter of the set respectively coupled to each of said at least two light sources.

19. A method for extending the life of an electronic display having at least two light sources, the method comprising the steps of:
   cumulatively measuring the amount of time each of said at least two light sources is activated;
   waiting for a transition of the display illumination;
   selecting the light source with the least cumulatively acquired time activated thereby creating a selected light source; and
   activating the selected light source to illuminate the display.

20. An electronic device using the method of claim 19 to control the illumination of a display in the electronic device.

21. A method for extending the life of an electronic display having at least two light sources, the method comprising the steps of:
   cumulatively measuring the amount of current consumed by each of said at least two light sources when activated;
   waiting for a transition of the display illumination;
   selecting the light source with the least cumulatively consumed current thereby creating a selected light source; and
   activating the selected light source to illuminate the display.

22. An electronic device using the method of claim 21 to control the illumination of a display in the electronic device.

* * * * *